United States Patent [19]

Su

[11] 3,847,554
[45] Nov. 12, 1974

[54] ANALYSIS OF MATERIALS TO MEASURE VAPORIZABLE COMPONENTS

[75] Inventor: Tsung-Yuan Su, Greenville, S.C.

[73] Assignee: Phillips Fibers Corporation, Greenville, S.C.

[22] Filed: Feb. 5, 1973

[21] Appl. No.: 329,559

[52] U.S. Cl. ...... 23/253 PC, 23/230 PC, 23/230 M, 23/254 R
[51] Int. Cl. ...................... G01n 7/16, G01n 33/36
[58] Field of Search ...... 23/230 PC, 253 PC, 254 R, 23/232 R, 232 C

[56] References Cited
UNITED STATES PATENTS

| | | |
|---|---|---|
| 3,065,060 | 11/1962 | Roehrig et al. ................. 23/253 PC |
| 3,366,149 | 1/1968 | Taft et al. ......................... 23/254 R |
| 3,495,944 | 2/1970 | McGee et al. .................... 23/254 R |
| 3,607,076 | 9/1971 | Paine .............................. 23/253 PC |
| 3,679,364 | 7/1972 | Teal et al. ....................... 23/253 PC |
| 3,703,355 | 11/1972 | Takahashi et al. .............. 23/253 PC |
| 3,753,654 | 8/1973 | Eggertsen ....................... 23/253 PC |

*Primary Examiner*—R. E. Serwin

[57] ABSTRACT

The vaporizable components of a material, such as the moisture present in a solid polymer, are measured by vaporizing the components in a heated chamber and passing the resulting vapor to an analyzer. The chamber can be evacuated before the sample material is introduced.

3 Claims, 2 Drawing Figures

PATENTED NOV 12 1974  3,847,554

ANALYSIS OF MATERIALS TO MEASURE VAPORIZABLE COMPONENTS

It is often desirable to measure the vaporizable components of a test material. For example, the determination of the moisture content of polymeric materials is useful in the textile industry. This invention provides methods and apparatus for making such determinations.

In accordance with a first embodiment of this invention, a chamber having two compartments is provided, the first of which has a heater associated therewith. A movable barrier is positioned so that the two compartments can be in open communication or separated from one another. A conduit system is provided for introducing a gas into the second compartment, removing gas from the first compartment, and passing the removed gas to an analyzer. A vacuum source is selectively connected to the first compartment so that pressure therein can be reduced. In operation, the first compartment is evacuated and a sample material positioned therein is heated rapidly to vaporize volatile components. A gas flow is then directed through the first compartment to drive these components to the analyzer.

In accordance with the second embodiment of this invention, a vaporization chamber is provided through which a flow of gas is directed to an analyzer. A sample of the material to be analyzed is dissolved in a solvent, introduced into the chamber, and rapidly heated. The volatile components are carried from the chamber by the gas stream to the analyzer.

In the accompanying drawing.

Figure 1:
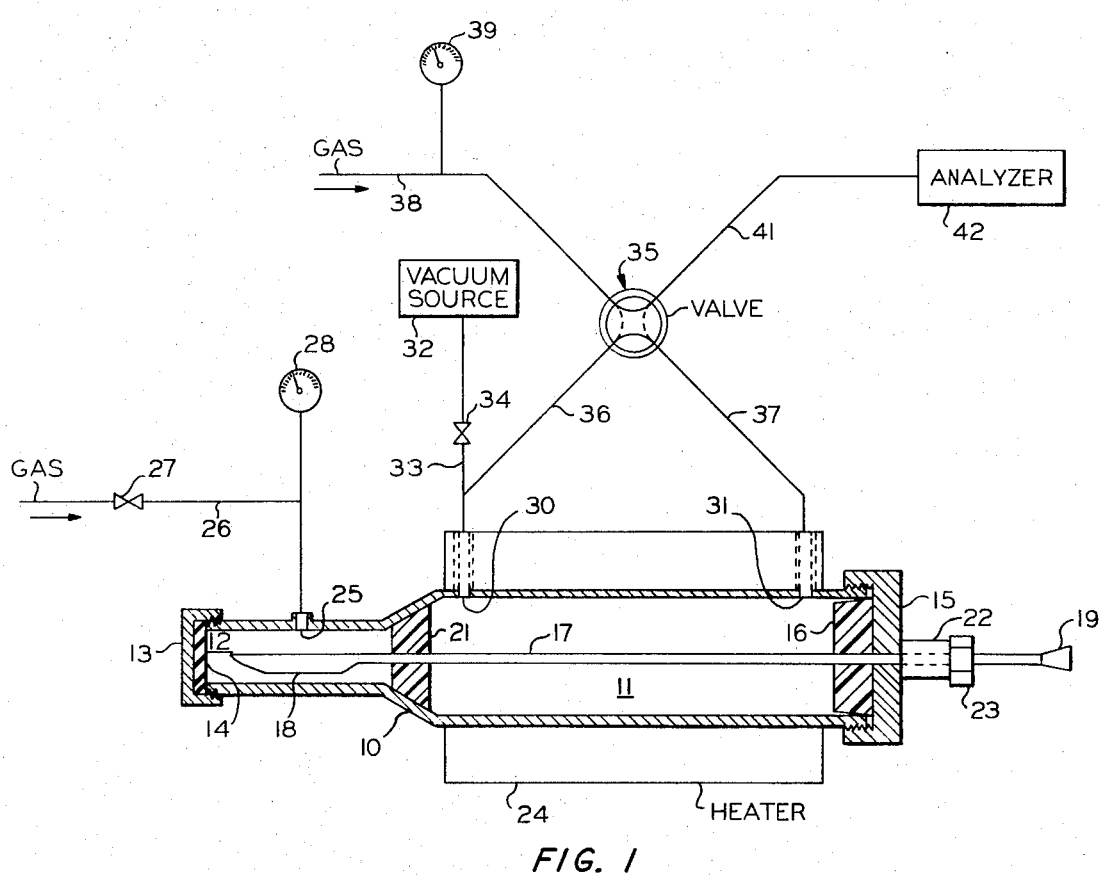
FIG. 1 is a schematic representation of a first embodiment of the apparatus of this invention.

Referring now to the drawing in detail and to FIG. 1 in particular, there is shown a housing 10, the interior of which forms a chamber having a first compartment 11 and a second compartment 12. The first end of housing 10 is closed by a cap 13 which engages a rubber sealing gasket 14. The second end of housing 10 is closed by a cap 15 which forces a gasket 16 into the second end of the housing. Gasket 16 is formed of a material which is capable of withstanding elevated temperatures. Teflon (polymerized tetrafluoroethylene) can be employed to advantage for this purpose. An elongated rod 17 extends through cap 15 and gasket 16 into compartment 12 to support a tray 18 which is adapted to receive a sample of the material to be analyzed. The second end of rod 17 is provided with a knob 19 to facilitate movement of the rod. A plug 21, formed of a high temperature resistant material such as Teflon, is fastened to rod 17 so as to engage housing 10 to form a seal between the two compartments when rod 17 is inserted to the position illustrated. A packing gland 22 having a lock nut 23 thereon is attached to cap 15 to secure rod 17 at a selected location. A heater 24 encloses compartment 11.

Compartment 12 is provided with an opening 25. A conduit 26, having a valve 27 therein, extends from a gas source, not shown, to opening 25. A pressure gauge 28 is connected to conduit 26. Compartment 11 is provided with two spaced openings 30 and 31. A vacuum source 32 is connected to opening 30 by a conduit 33 which has a valve 34 therein. The first port of a four-way valve 35 is connected by a conduit 36 to opening 30. A second port of valve 35 is connected by a conduit 37 to opening 31. A conduit 38 extends from a gas source, not shown, to the third port of valve 35. A pressure gauge 39 is connected to conduit 38. A conduit 41 extends from the fourth port of valve 35 to an analyzer 42, which can be a conventional chromatographic analyzer, for example.

The operation of the apparatus of FIG. 1 will be described in conjunction with the analysis of a nylon polymer sample to determine the moisture content thereof. Conduits 26 and 38 are connected to helium sources. Valve 35 is positioned initially so that helium flows from conduit 38 to conduit 41 and to analyzer 42. This valve position results in conduits 36 and 37 being connected to one another through valve 35. Compartment 11 is heated to an elevated temperature, such as 460°C, for example, which is sufficiently high to melt the polymer sample. Rod 17 is then moved to the right so that compartments 11 and 12 are in open communication. Valve 27 is opened to introduce helium into compartments 11 and 12 and the loop formed by conduits 36 and 37. Valve 34 is closed at this time. Rod 17 is then moved to the left so that plug 21 blocks communication between compartments 11 and 12 and tray 18 is positioned within compartment 12, as illustrated.

Cap 13 and gasket 14 are removed and a sample of the polymer to be analyzed is positioned in tray 18. Cap 13 and gasket 14 are then replaced. Valve 34 is opened so that compartment 11 is connected to vacuum source 32 to reduce the pressure to about 300 millimeters mercury, for example. Valve 34 is then closed so that compartment 11 remains evacuated. If desired, conduit 33 can be connected to opening 31 instead of opening 30.

The next step is to move rod 17 to the right so as to position tray 18 within heated compartment 11. The polymer sample is heated for some 2 to 5 minutes so that the polymer is melted completely to release all moisture contained therein. Valve 27 is then opened to introduce helium into compartments 11 and 12 and the loop formed by conduits 36 and 37. The pressure of the helium in conduit 26 is adjusted so that the pressure observed on gauge 28 is the same as the pressure observed on gauge 39. Valve 27 can then be closed. Valve 35 is turned swiftly so that conduit 38 is connected to conduit 36 and conduit 37 is connected to conduit 41. This results in helium flowing from conduit 38 through conduit 36, compartment 11, conduit 37 and conduit 41 to the inlet of analyzer 42. The flow of helium sweeps the water vapor from compartment 11 into the chromatographic analyzer. If necessary, a screen can be placed across opening 31 to prevent passage of any solid particles of the sample that may be present.

The foregoing operation results in all of the water present in the polymer sample being injected into the analyzer in a short interval of time. This greatly reduces the tailing which would normally occur in the chromatogram if the polymer sample were merely heated so that the moisture were evolved and passed to the analyzer over a period of several minutes. The analysis obtained by the method of this invention is much more accurate.

Figure 2:
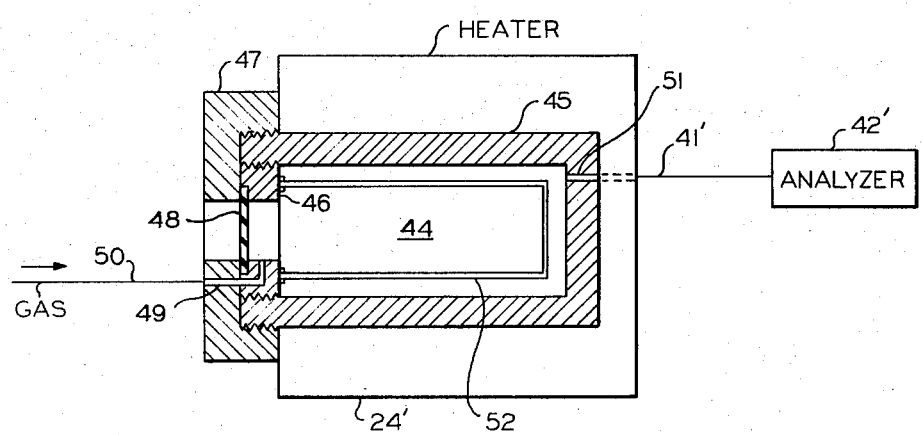
FIG. 2 is a schematic representation of a second embodiment of the apparatus of this invention.

In the embodiment of this invention illustrated in FIG. 2, a single chamber 44 is formed by a housing 45 which is surrounded by a heater 24'. A ring 46 is threaded into the end of housing 45, and a cap 47 is threaded across the end of the housing. A rubber diaphragm 48 is positioned between ring 46 and cap 47 to close the end of chamber 44. A passage 49 is formed in cap 47 and ring 46, and a conduit 50 is connected thereto to introduce gas into chamber 44. Housing 45 is provided with a second opening 51 which connects with outlet conduit 41' which extends to an analyzer 42'. A screen 52 of fine mesh is positioned within chamber 44 to separate inlet opening 49 from outlet opening 51.

In the operation of the apparatus of FIG. 2, chamber 42 is maintained at an elevated temperature by heater 24', and gas from a source, not shown, flows through chamber 44 to analyzer 42'. A sample of the material to be analyzed is injected into chamber 44 by a hypodermic needle which is inserted through diaphragm 48. The sample should be in liquid form for this purpose. If a solid polymer is to be analyzed, it can advantageously be dissolved in a suitable solvent to permit introduction into chamber 44 as a liquid. The volatile components of the sample are vaporized by the elevated temperature and carried by the gas stream to analyzer 42'. Screen 52 is provided to trap any solid particles which might be present.

While this invention has been described in conjunction with presently preferred embodiments, it should be apparent that it is not limited thereto.

What is claimed is:

1. Apparatus adapted to be used in the analysis of materials to detect vaporizable components thereof comprising:
   a housing forming first and second chambers, said first chamber having first and second openings therein in spaced relationship with one another, said second chamber having a third opening therein;
   a barrier movably positioned so as to block communication between the two chambers when located in a first position and to permit communication between the two chambers when located in a second position;
   a pan connected to said barrier so as to be located in said second chamber when said barrier is in said first position;
   means connected to said barrier to move said barrier from said first position to said second position and thereby move said pan into said first chamber; and
   heating means associated with said first chamber to elevate the temperature thereof.

2. The apparatus of claim 1, further comprising:
   first conduit means communicating with said third opening to introduce a gas;
   second conduit means to introduce a gas;
   third conduit means to withdraw a fluid sample to be analyzed;
   fourth conduit means communicating with said first opening;
   fifth conduit means communicating with said second opening; and
   valve means connected to said second, third, fourth and fifth conduit means so as to connect said second and third conduit means and said fourth and fifth conduit means when the valve means is in a first position and to connect said second and fourth conduit means and said third and fifth conduit means when the valve means is in a second position.

3. The apparatus of claim 2, further comprising a vacuum source connected to one of said fourth and fifth conduit means.

* * * * *